(12) United States Patent
Smith

(10) Patent No.: US 9,977,309 B2
(45) Date of Patent: May 22, 2018

(54) ELECTROPHORETIC FLUID

(71) Applicant: Merck Patent GmbH, Darmstadt (DE)

(72) Inventor: Nathan Smith, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 0 days. days.

(21) Appl. No.: 15/105,340

(22) PCT Filed: Dec. 4, 2014

(86) PCT No.: PCT/EP2014/003241
§ 371 (c)(1),
(2) Date: Jun. 16, 2016

(87) PCT Pub. No.: WO2015/090519
PCT Pub. Date: Jun. 25, 2015

(65) Prior Publication Data
US 2016/0313624 A1 Oct. 27, 2016

(30) Foreign Application Priority Data

Dec. 19, 2013 (EP) ..................................... 13005934

(51) Int. Cl.
*G02B 26/00* (2006.01)
*G02B 26/08* (2006.01)
(Continued)

(52) U.S. Cl.
CPC .............. *G02F 1/167* (2013.01); *C09B 1/285* (2013.01); *C09B 29/0048* (2013.01); *C09B 29/0081* (2013.01); *C09B 29/0808* (2013.01); *C09B 31/043* (2013.01); *C09B 35/20* (2013.01); *C09B 67/0033* (2013.01); *G02F 2001/1678* (2013.01)

(58) Field of Classification Search
CPC ............. G02F 1/167; G02F 2001/1678; G02F 1/0063; G02F 1/17; G02F 2203/34; G02F 1/0009; G02F 1/09; G02F 1/133514; G02F 1/15; G02F 1/153; G02F 1/172; G02F 2001/094; G02F 2001/1512; G02F 2001/1672; G02F 2201/123; G02F 2202/04
USPC ........ 359/237, 242–246, 270–273, 290–292, 359/295, 296, 298
See application file for complete search history.

(56) References Cited

U.S. PATENT DOCUMENTS 5,380,362 A 1/1995 Schubert
5,403,518 A 4/1995 Schubert
(Continued)

FOREIGN PATENT DOCUMENTS

EP 1491941 A2 12/2004
EP 2407824 A1 1/2012
(Continued)

OTHER PUBLICATIONS

International Search Report for PCT/EP2014/003241 dated Mar. 23, 2015.
(Continued)

*Primary Examiner* — Brandi Thomas

(57) ABSTRACT

This invention relates to electrophoretic fluids comprising a solvent, a dye, white particles, and colored particles selected from red, green, blue, magenta, cyan, yellow particles, and mixtures thereof, and electrophoretic display devices comprising such fluids.

17 Claims, 2 Drawing Sheets

(51) Int. Cl.
*G02F 1/29* (2006.01)
*G02F 1/167* (2006.01)
*C09B 29/033* (2006.01)
*C09B 31/043* (2006.01)
*C09B 35/20* (2006.01)
*C09B 67/22* (2006.01)
*C09B 1/28* (2006.01)
*C09B 29/036* (2006.01)
*C09B 29/08* (2006.01)

(56) References Cited

U.S. PATENT DOCUMENTS

| | | | |
|---|---|---|---|
| 5,783,614 A | 7/1998 | Chen et al. | |
| 6,194,488 B1 | 2/2001 | Chen et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 2007/0128352 A1 | 6/2007 | Honeyman et al. | |
| 2007/0268244 A1 | 11/2007 | Chopra et al. | |
| 2010/0053728 A1 | 3/2010 | Lin et al. | |
| 2011/0025681 A1 | 2/2011 | Komatsu et al. | |
| 2011/0255145 A1 | 10/2011 | Masuzawa et al. | |
| 2012/0194899 A1 | 8/2012 | Zhang | |
| 2015/0168797 A1* | 6/2015 | Greinert | G02F 1/167 |
| | | | 252/583 |

FOREIGN PATENT DOCUMENTS

| | | |
|---|---|---|
| GB | 2438436 A | 11/2007 |
| WO | WO-99/10767 A1 | 3/1999 |
| WO | WO-2005017046 A2 | 2/2005 |
| WO | WO-2008026158 A2 | 3/2008 |
| WO | WO-2009100803 A2 | 8/2009 |
| WO | WO-2010089057 A2 | 8/2010 |
| WO | WO-2010089058 A1 | 8/2010 |
| WO | WO-2010089059 A1 | 8/2010 |
| WO | WO-2010089060 A2 | 8/2010 |
| WO | WO-2011154103 A1 | 12/2011 |
| WO | WO-2011154104 A1 | 12/2011 |
| WO | WO-2012019704 A1 | 2/2012 |
| WO | WO-2013026519 A1 | 2/2013 |
| WO | WO-2013079146 A1 | 6/2013 |
| WO | WO 2013079158 * 6/2013 | ............ G02F 1/167 |
| WO | WO-2013079158 A1 | 6/2013 |
| WO | WO-2013149714 A1 | 10/2013 |

OTHER PUBLICATIONS

European Office Action for European Application No. 14 835 473.1, date Jul. 17, 2017.

* cited by examiner

ELECTROPHORETIC FLUID

CROSS-REFERENCE TO RELATED APPLICATIONS

This application is a national stage application (under 35 U.S.C. § 371) of PCT/EP2014/003241, filed Dec. 4, 2014, which claims benefit of European Application No. 13005934.8, filed Dec. 19, 2013, both of which are incorporated herein by reference in their entirety.

This invention relates to electrophoretic fluids comprising a solvent, a dye, white particles, and coloured particles selected from red, green, blue, magenta, cyan, yellow particles, and mixtures thereof, and electrophoretic display devices comprising such fluids.

BACKGROUND OF THE INVENTION

There is an interest in materials that can be used for electronic signage applications. Typically such applications are outdoors or in well-lit locations and emissive technologies such as LCDs exhibit increased backlight power consumption in order to overcome ambient lighting conditions. There is an advantage to be found if a low power technology can be used. One such technology is Electrophoretic Displays (EPDs). These rely on the reflection of ambient light, and are therefore ideal for conditions where the ambient light is high intensity—such as outdoors or in shops and restaurants. To use an EPD with low intensity (or without) ambient light, a front light is required, however the power consumption of front lighting is far less than that of an LCD backlight.

Particles suitable for use in electrophoretic displays (EPD), e.g. coloured electronic paper have been exemplified in recent patent literature; e.g. (U.S. Pat. No. 7,304,634, GB 2 438 436, US 2007/0268244). It is now possible to control and manipulate features such as size, colour, charge and polydispersity independently to produce particles with desired properties for EPD; e.g. WO 2010/089057. A number of different techniques can be used to create an optical effect by the movement of particles. One such method can incorporate the use of reflective colour particles, and absorbing black particles to generate a pixel that can be switched between a colour, and a black optical state.

The earlier application WO2013/189580 describes a method of using electrophoretic materials to generate high colour saturation and high reflectivity in a Black/Colour pixel by using black and white particles with a dyed solvent. This method is limited to Black vs. Colour, or 3 state pixels of Black vs. Colour vs. White.

One major drawback of EPD is that it is challenging to achieve good saturated colour, and the range of colours is limited. So, there continues to be a demand for improved electrophoretic fluids.

BRIEF SUMMARY OF THE INVENTION

The present invention relates to electrophoretic fluids according to claim 1. The electrophoretic fluids comprise at least one solvent, at least one dye, optionally white particles, and coloured particles selected from red, green, blue, magenta, cyan, yellow particles, and mixtures thereof. Furthermore, the invention relates to electrophoretic displays comprising the new electrophoretic fluids. The invention also relates to a method of displaying different colour states in an electrophoretic display comprising such fluids by vertical movement of particles in the fluids.

Preferably, the electrophoretic fluids do not comprise any black particles. Preferably, the electrophoretic fluids consist of at least one solvent, at least one dye, optionally white particles, optionally at least one additive to improve electrophoretic properties, and at least one set of coloured particles selected from red, green, blue, magenta, cyan, and yellow particles. Mixtures thereof may also be used. Preferably, the white particles and the coloured particles are oppositely charged or chargeable. The coloured particles may be light transmissive coloured particles ("transmissive coloured particles") or light reflective coloured particles ("reflective coloured particles"). Preferably, transmissive coloured particles are used, especially coloured particles with selective transmission between the wavelength region from about 380 to about 780 nm. Preferably, the electrophoretic fluids consist of at least one solvent, at least one dye, optionally at least one additive to improve electrophoretic properties, white particles, and a set of transmissive coloured particles selected from red, green, blue, magenta, cyan, and yellow particles. Optionally, mixtures of coloured particles may also be used.

The new electrophoretic fluids extend the colour range possible and generate multi-colour EPD devices by using coloured particles in combination with white particles and dyes. Furthermore, the electrophoretic fluids of the invention provide good colour saturation and reflectivity. The fluids can preferably utilise simple vertical switching to exhibit dual-state pixels and multiple colours are possible. By applying a suitable driving scheme, particle spacing can be either increased or reduced.

By ensuring sufficient spacing between the white particles, a colour state can be achieved due to the colour of the dye. By ensuring sufficient spacing between the coloured particles, a colour state can be achieved due to the colour of the dye and the colour of the coloured particles. By reducing the spacing between the white particles, a three-colour pixel could be achieved, whereby the display appears white when the white particles are compressed at the top of the electrode. Additionally, by reducing the spacing between the coloured particles a colour state can be achieved due to the colour of the coloured particles, wherein preferably reflective coloured particles are used.

DETAILED DESCRIPTION OF THE INVENTION

Preferably, the electrophoretic fluid provides different colour states on vertical movement of the particles; preferably in combination with adequate spacing of the particles. The invention especially provides a first colour state based on the colour of the dye, and a second colour state based on the colour of the dye and on the colour of the coloured particles, preferably on the colour of transmissive coloured particles. It is also possible to provide a first colour state based on the colour of the dye, a second colour state based on the colour of the dye and on the colour of the coloured particles, preferably on the colour of transmissive coloured particles, and a third colour state based on the white particles.

In particular, the invention provides on vertical switching of the particles 2 state pixels of Colour vs. Colour or 3 state pixels of Colour vs. Colour vs. White. By using colour mixing knowledge, multiple colours are possible. By using a combination of dyes and coloured particles, preferably transmissive coloured particles, an increased choice of colour and colour tuning for specific applications, e.g. a company logo, or colour gamut adjustment can be achieved.

In a variant of the invention, a colour state based on the colour of the coloured particles can be achieved in addition to the colour states based on the colour of the dye and, respectively a colour state based on the colour of the dye and the colour of the particles, whereby 3 state pixels of Colour vs. Colour vs. Colour or 4 state pixels of Colour vs. Colour vs. Colour vs. White can be provided.

The particles can either be spaced or compressed onto the electrode via driving waveform, to get all colours in one pixel.

In an especially preferred embodiment of the invention, a 2 state pixels of Colour vs. Colour is provided on vertical switching of the particles and alternating the spacing between particles, especially based on transmissive coloured particles.

The preferred embodiment of the invention is the use of transmissive coloured particles. The principle behind this embodiment of the invention works as shown in FIG. 1 for 3 state pixels of Yellow vs. Red vs. White. This example shows the use of a yellow dye, transmissive magenta particles, and white particles. The yellow state occurs when light passes through the yellow dye, and reflects from the white particles, back through the yellow dye and to the viewer.

The red state occurs when light passes through the yellow dye AND transmissive magenta particles (M+Y=R), and is reflected from the white particles.

A white state can be achieved by close packing of the white particles at the top electrode.

By using preferred transmissive coloured particles and dyes, just considering CMY and RGB, lots of different colour states may be achieved. The following dual state pixels shown in Table 1 can preferably be achieved, wherein the Resulting State 1 shows the colour based on the colour of the dye and Resulting State 2 shows the colour based on the colour of the dye and on the colour of the transmissive coloured particle.

TABLE 1

| White Particle | Colour Particle | Dye | Resulting State 1 | Resulting State 2 |
|---|---|---|---|---|
| White | Magenta | Cyan | Cyan | Blue |
| White | Yellow | Cyan | Cyan | Green |
| White | Red | Cyan | Cyan | Black |
| White | Green | Cyan | Cyan | Greenish Cyan |
| White | Blue | Cyan | Cyan | Bluish Cyan |
| White | Cyan | Magenta | Magenta | Blue |
| White | Yellow | Magenta | Magenta | Red |
| White | Red | Magenta | Magenta | Reddish Magenta |
| White | Green | Magenta | Magenta | Black |
| White | Blue | Magenta | Magenta | Purple |
| White | Cyan | Yellow | Yellow | Green |
| White | Magenta | Yellow | Yellow | Red |
| White | Red | Yellow | Yellow | Orange |

TABLE 1-continued

| White Particle | Colour Particle | Dye | Resulting State 1 | Resulting State 2 |
|---|---|---|---|---|
| White | Green | Yellow | Yellow | Greenish Yellow |
| White | Blue | Yellow | Yellow | Black |
| White | Cyan | Red | Red | Black |
| White | Magenta | Red | Red | Magentaish Red |
| White | Yellow | Red | Red | Orange |
| White | Green | Red | Red | Yellow |
| White | Blue | Red | Red | Purple |
| White | Cyan | Green | Green | Cyanish green |
| White | Magenta | Green | Green | Black |
| White | Yellow | Green | Green | Yellowish Green |
| White | Red | Green | Green | Yellow |
| White | Blue | Green | Green | Cyan |
| White | Cyan | Blue | Blue | Cyanish blue |
| White | Magenta | Blue | Blue | Magentaish blue |
| White | Yellow | Blue | Blue | Black |
| White | Red | Blue | Blue | Magenta |
| White | Green | Blue | Blue | Cyan |

If reflective coloured particles are used a colour state based on the colour of the reflective coloured particles can be achieved, too. For example, when reflective magenta particles M are used together with a yellow dye Y and white particles, the following colour states can be achieved:
i) Magenta state when M are compressed;
ii) Red state when M are spaced at top electrode (M+Y);
iii) Yellow state based on the yellow dye when white particles are spaced at top electrode; and
iv) White state by close packing of the white particles at the top electrode.

Further colour states can be achieved, for example, when reflective magenta particles M and reflective cyan particles C are used together with a yellow dye Y the following colour states can be achieved:
i) Magenta state when M are compressed;
ii) Cyan state when C are compressed;
iii) Red state when M are spaced at top electrode (M+Y);
iv) Green state when C are spaced at top electrode (C+Y);
v) Yellow state based on the yellow dye.

When the electrophoretic fluid additionally comprises white particles, a White state may also be achieved by close packing of the white particles at the top electrode.

The particles can be spaced via driving waveform, to get all colours in one pixel.

Table 2 shows a summary of 4-state pixels showing the colour states based on the colour of dyes and the colour of two different reflective coloured particles which result in 4 primary colours. A range of 'inbetween' colours are also possible, for example, orange and purple, when using other particles/dye combinations.

TABLE 2

| 1st Particle | 2nd Particle | dye | Particle 1 compressed | Particle 2 compressed | Particle 1 spaced | Particle 2 spaced |
|---|---|---|---|---|---|---|
| R | B | G | RED | BLUE | YELLOW | CYAN |
| G | B | R | GREEN | BLUE | YELLOW | MAGENTA |
| C | G | R | CYAN | GREEN | BLACK | YELLOW |
| G | C | M | GREEN | CYAN | BLACK | BLUE |
| B | C | R | BLUE | CYAN | MAGENTA | BLACK |
| R | M | C | RED | MAGENTA | BLACK | BLUE |
| R | Y | C | RED | YELLOW | BLACK | GREEN |
| R | G | B | RED | GREEN | MAGENTA | CYAN |
| R | Y | B | RED | YELLOW | MAGENTA | BLACK |

Electrophoretic fluids of the invention comprise dyes and dye mixtures; preferably dyes with high absorbance and preferably with increased solubility in non-polar solvents. Preferably, the dyes have an absorbance of at least 0.3 a.u., preferably of at least 0.5 a.u., especially of at least 0.7 a.u., in a cell thickness of 50 microns. The preferred solvents are non-polar hydrocarbon solvents such as the Isopar series (Exxon-Mobil), Norpar, Shell-Sol (Shell), Sol-Trol (Shell), naphtha, and other petroleum solvents, as well as long chain alkanes such as nonane, decane, dodecane, and tetradecane. Preferably, the absorbance is measured for a saturated solution of dyes in dodecane. Most advantageously used are dyes with an absorbance as high as possible. The absorbance data can be derived using the Lambert-Beer law $A=-\lg(I/I_0)=\epsilon cd$, where A is the absorbance at a certain wavelength, I is the intensity of the transmitted radiation, $I_0$ is the intensity of the radiation before transmission, $\epsilon$ is the molar extinction coefficient (l/mol cm), c is the concentration (mol/l), and d is the path length (cm). The absorbance is unitless. However, the absorbance is often reported in "arbitrary units" (a.u.) or in "Absorbance Units" (AU). Arbitrary units (a.u.) are used throughout the present invention. The absorbance of the dyes can preferably be measured using a Hitachi U3310 UV-vis spectrophotometer and a saturated solution of dyes in dodecane.

The required solubility in non-polar solvents, preferably the solvents cited in the foregoing paragraph, depends upon the extinction coefficient of the dye, but usually should be over 1% by weight and preferably >5% by weight. Dye solubilities of >20% by weight have been observed and can preferably be utilized in this method to give maximum colour saturation.

The function of the dye is to colour the electrophoretic fluid. The dye consists of a chromophore, optional linker groups (spacers), and optional groups to modify physical properties (like solubility, light fastness, etc.) and optionally charged group(s). Careful design of the dye structure and using a mixture of homologues can result in increased solubility.

The chromophoric group preferably comprises of conjugated aromatic (including heteroaromatic) and/or multiple bonds including: azo (including monoazo, disazo, trisazo linked azos etc), metallised azo, anthraquinone, pyrroline, phthalocyanine, polymethine, aryl-carbonium, triphendioxazine, diarylmethane, triarylmethane, anthraquinone, phthalocyanine, methine, polymethine, indoaniline, indophenol, stilbene, squarilium, aminoketone, xanthene, fluorone, acridene, quinolene, thiazole, azine, induline, nigrosine, oxazine, thiazine, indigoid, quinonioid, quinacridone, lactone, benzodifuranone, flavonol, chalone, polyene, chroman, nitro, naphtholactam, formazene or indolene group or a combination of two or more such groups. Preferred chromophoric groups are azo groups (especially monoazo, and disazo) and anthraquinone groups.

A dye may contain a single chromophore, for example with bright yellow, magenta or cyan colours and self shade blacks. However, it may also contain mixed covalently attached chromophores for example to obtain a black colour, by covalently attached brown and blue or yellow, magenta and cyan. Green can be obtained by yellow and cyan etc. Extended conjugated chromophores can also be used to obtain some shades. For example, di- and tris azo compounds can be used to obtain blacks and other duller shades (navy blue, brown, olive green, etc).

Mixtures of dyes can also be used to obtain the correct electrophoretic fluid shade. Similarly shades can be tuned by for example by adding small quantities of separate dyes to modify the colour of the electrophoretic fluid (e.g. 95% yellow and 5% cyan to get a greener yellow shade).

A particular focus is the use of mixtures of one chromophore. The solubilising groups on the chromophore are preferably hydrocarbon chains consisting of 4 or more carbons. These chains can be straight chain, branched chain, contain isomers such diastereoisomers, be optionally substituted with O, S, N, F. Preferably a mixture of homologues comprising hydrocarbon chains consisting of 8-20 carbons is used to give highest solubility. One advantage is that a mixture of homologues can be prepared in a one pot procedure, reducing cost of preparing individual dyes.

Dyes having improved solubility, preferably in non-polar solvents and hence higher absorbance of the resultant solution can preferably be used. By using a multi-component dye concept the solubility can be further increased to enable a highly absorbing material suitable for use in EPD. By mixing dyes of identical chromophore, but with altered surrounding structure, the overall solubility of the dye chromophore is increased, and higher absorbance values can be achieved. By adding dyes with similar chromophore/altered surrounding structure, a multi-component dye system results in enhanced solubility and absorbance. One advantage is that a mixture of homologues can be prepared in a one pot procedure, reducing cost of preparing individual dyes.

Advantageously, dye mixtures utilising the same chromophore but with variation of the solubilising groups are used. This gives hugely improved solubility. Surprisingly, when a mixture of the same chromophore but with different long hydrocarbon groups to increase solubility is used, solubility of up to 15% is achieved. Especially, combinations of dyes are used to achieve electrophoretic fluids with strong colour intensity.

Preferred embodiments are:
Electrophoretic fluids comprising at least two dyes wherein each dye comprises at least one chromophoric group and at least one solubilising group and wherein at least two dyes comprise different solubilising groups;
Electrophoretic fluids comprising dyes having different hydrocarbon groups selected from straight chain or branched hydrocarbon groups with at least 4 carbon atoms, optionally substituted with O, S, N or F atoms;
Electrophoretic fluids comprising at least two dyes with homologue solubilising groups;
Electrophoretic fluids comprising at least two dyes with the same chromophoric group;
Electrophoretic fluids comprising at least two dyes with different chromophoric groups.

Preferably, the electrophoretic fluid of the invention comprises at least one dye according to Formula I, Formula II, Formula III, Formula IV, Formula V or Formula VI Formula I

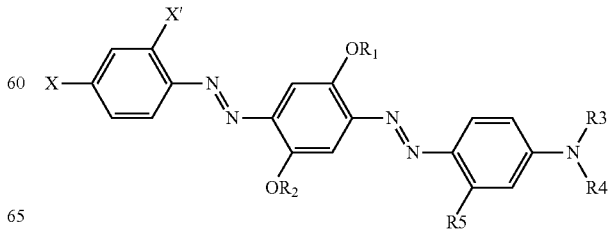

wherein

X and X' are independently of one another H or an electron-withdrawing group;

$R_1$ and $R_2$ are independently of one another groups are linear or branched, substituted or unsubstituted alkyl groups where one or more non-adjacent carbon atoms may be replaced by O, S and/or N, preferably C8-C20;

$R_3$ and $R_4$ are independently of one another groups are linear or branched, substituted or unsubstituted alkyl groups where one or more non-adjacent carbon atoms may be replaced by O, S and/or N, preferably C8-C20;

R5 is a methyl or methoxy group;

and the dye comprises at least one electron-withdrawing group;

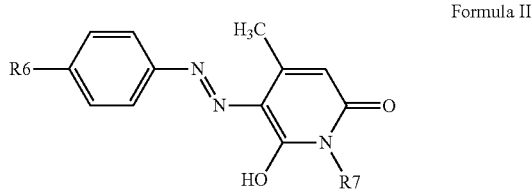

Formula II wherein $R_6$ and $R_7$ are independently of one another groups are linear or branched, substituted or unsubstituted alkyl groups where one or more non-adjacent carbon atoms may be replaced by O, S and/or N, preferably C8-C20;

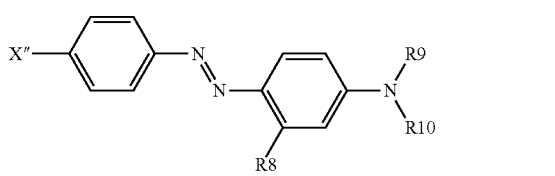

Formula III wherein

X" is an electron-withdrawing group;

$R_8$ is a methyl or methoxy group;

$R_9$ and $R_{10}$ are independently of one another groups are linear or branched, substituted or unsubstituted alkyl groups where one or more non-adjacent carbon atoms may be replaced by O, S and/or N; preferably C8-C20;

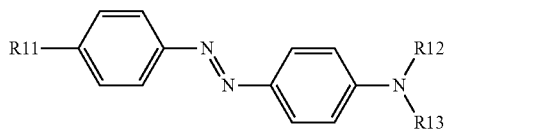

Formula IV wherein $R_{12}$ and $R_{13}$ are independently of one another groups are linear or branched, substituted or unsubstituted alkyl groups where one or more non-adjacent carbon atoms may be replaced by O, S and/or N; preferably C8-C20;

$R_{11}$ is an alkyl or alkoxy group with at least 3 carbon atoms;

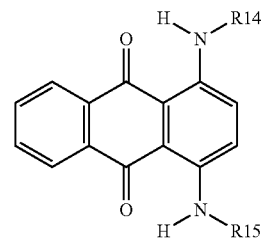

Formula V wherein $R_{14}$ and $R_{15}$ are independently of one another groups are linear or branched, substituted or unsubstituted alkyl groups where one or more non-adjacent carbon atoms may be replaced by O, S and/or N; preferably C8-C20;

Formula VI wherein

X''' is an electron-withdrawing group;

$R_{16}$ and $R_{17}$ are independently of one another groups are linear or branched, substituted or unsubstituted alkyl groups where one or more non-adjacent carbon atoms may be replaced by O, S and/or N, preferably C8-C20.

$R_{18}$ is NHCOR with R=linear or branched C1-C10 alkyl groups, preferably NHCOCH$_3$.

The term "electron-withdrawing group" is well known in the art and refers to the tendency of a substituent to attract valence electrons from neighbouring atoms; in other words the substituent is electronegative with respect to neighbouring atoms. Examples of electron-withdrawing groups include NO$_2$, CN, halogen, acyl, trifluoromethoxy, trifluoromethyl, SO$_2$F, and CO$_2$R, SO$_2$R, SO$_2$NRR or SO$_2$NHR, with R being independently linear or branched alkyl, preferably C1-C4 alkyl. Preferred electron-withdrawing groups are NO$_2$, CN, Br, Cl, SO$_2$NRR or SO$_2$NHR.

Suitable dyes and methods for their preparation and characterisation are also described for example in WO 2013/127494.

Preferably, dyes of Formula I with linear or branched C8-C20 alkyl groups are used, especially those with additional NO$_2$ and/or CN groups.

Also preferred are dyes of Formula II with linear or branched C8-C20 alkyl groups are used, especially those with additional NO$_2$ and/or CN groups. It is most advantageous to use mixtures of homologue dyes comprising dyes with different linear or branched alkyl groups, preferably with C8-C20 groups; for example mixtures of dyes with 2-ethylhexyl, n-octyl, 3,5,5-trimethylhexyl, n-decyl, n-undecyl, n-dodecyl, tetradecyl, and/or pentadecyl groups.

Also preferred are dyes of Formulae II, III, V, and VI.

Especially the dyes listed in the following tables may be used.

TABLE 3

Cyan Dyes

| Dye No. | Structure | Compound Data | Saturation wt % in decane |
|---|---|---|---|
| Dye 1 | 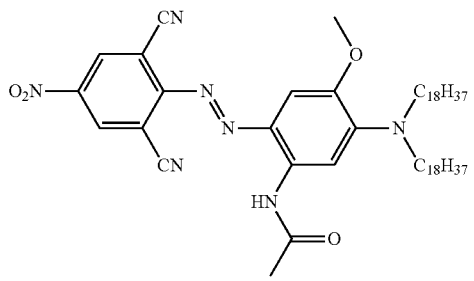 | UV-vis $\lambda_{max}$ 642 nm, $\epsilon_{max}$ 103,000 HBW 44 nm (hexane) $\lambda_{max}$ 595 nm, $\epsilon_{max}$ 48,500 HBW 77 nm (hexane) Mp: 95-97° C. | 0.003 |
| Dye 2 | R = n-octyl/2-ethylhexyl/undecyl/dodecyl | UV-vis $\lambda_{max}$ 645 nm, $\epsilon_{max}$ 15,000 (hexane) $\lambda_{max}$ 596 nm, $\epsilon_{max}$ 13,250 (hexane) Mp: amorphous solid | 4.2 |
| Dye 3 | R = 2-ethylhexyl/dodecyl/tetradecyl/pentadecyl | UV-vis $\lambda_{max}$ 645 nm, $\epsilon_{max}$ 15,750 (hexane) $\lambda_{max}$ 596 nm, $\epsilon_{max}$ 14,000 (hexane) Mp: amorphous solid | 4.557 |

TABLE 4

Magenta Dyes

| Dye No. | Structure | Compound Data | Saturation wt % in decane |
|---|---|---|---|
| Dye 4 | 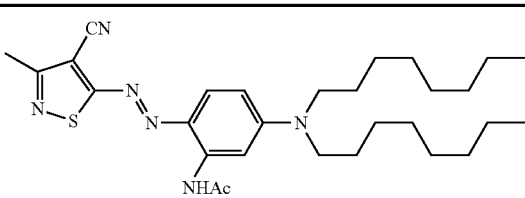 | UV-vis $\lambda_{max}$ 536 nm, $\epsilon_{max}$ 61,750 HBW 71 nm (hexane) $\lambda_{max}$ 548 nm, $\epsilon_{max}$ 61,000 HBW 77 nm (EtOAc) Mp: 110-111° C. | 0.19 |

TABLE 5

Yellow Dyes

| Dye No. | Structure | Compound Data | Saturation wt % in decane |
|---|---|---|---|
| Dye 5 | 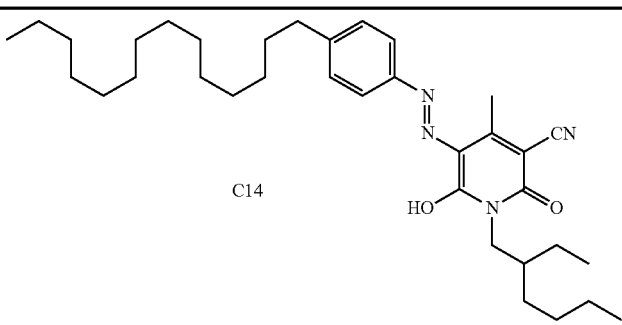 | UV-vis $\lambda_{max}$ 436 nm, $\epsilon_{max}$ 45,000 HBW 73 nm (hexane) HPLC (420 nm): >99.5% Mp: 73-75° C. | 1.03 |
| Dye 6 | 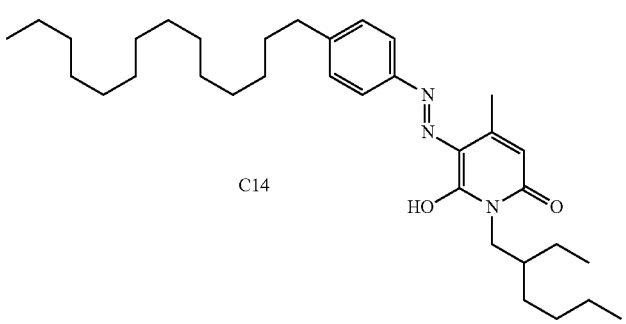 [SMILES: "C14" ; CCCCCCCCCCCCCCc1ccc(/N=N/c2c(C)cc(=O)n(CC(CC)CCCC)c2O)cc1] | UV-vis $\lambda_{max}$ 416 nm, $\epsilon_{max}$ 38,000 HBW 67 nm (hexane) Mp: 63-65° C. | 3.72 |
| Dye 7 | 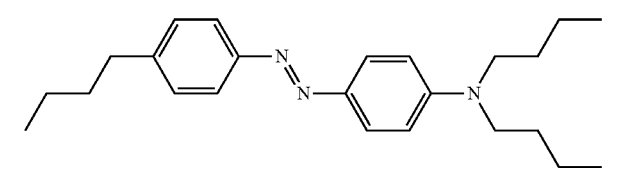 [SMILES: CCCCc1ccc(/N=N/c2ccc(N(CCCC)CCCC)cc2)cc1] | UV-vis $\lambda_{max}$ 407 nm, $\epsilon_{max}$ 38,000 HBW 68 nm (hexane) Mp: Oil at room temp | 9.95 |
| Dye 8 | 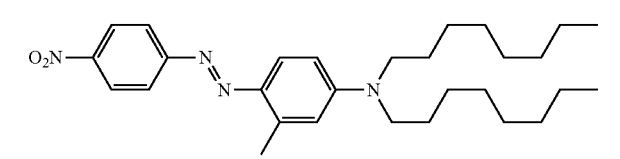 | UV-vis $\lambda_{max}$ 470 nm, $\epsilon_{max}$ 36,000 HBW 93 nm (hexane) Mp: 44-46° C. | 10.50 |

Preferably, Dyes 2, 4-6, and 8 can be used. In another preferred variant of the invention mixtures of dyes may be used, for example mixtures of Dye 6.

The following schemes show by way of example the synthesis of dyes of the invention, especially for dyes of Formulas I to VI which can be carried out by a process and under conditions known to the person skilled in the art; further details are given in the examples:

Scheme 1: Dyes of Formula I:

The preparation of dyes of Formula I by a 2 step procedure under convenient conditions as known in the art is exemplified in the following scheme for 4-((E)-(4-((E)-(2, 4-Dinitrophenyl)diazenyl)-2,5-bis(2-ethylhexyloxy)phenyl)diazenyl)-3-methyl-N,N-octyl/ethylhexyl-aniline:

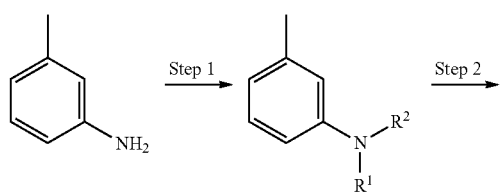

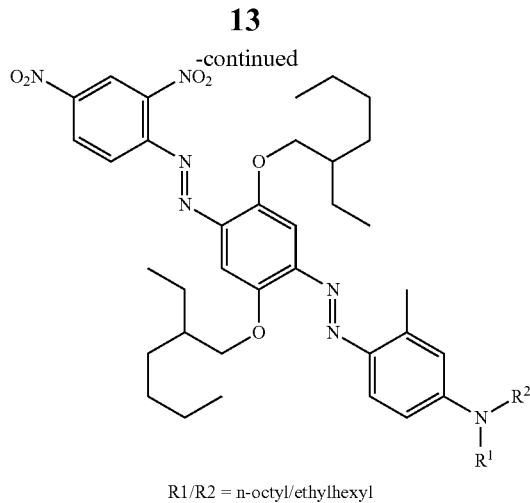

R1/R2 = n-octyl/ethylhexyl

Scheme 2: Dyes of Formula II:

The preparation of dyes of Formula II by a 2 step procedure under convenient conditions as known in the art is exemplified in the following scheme:

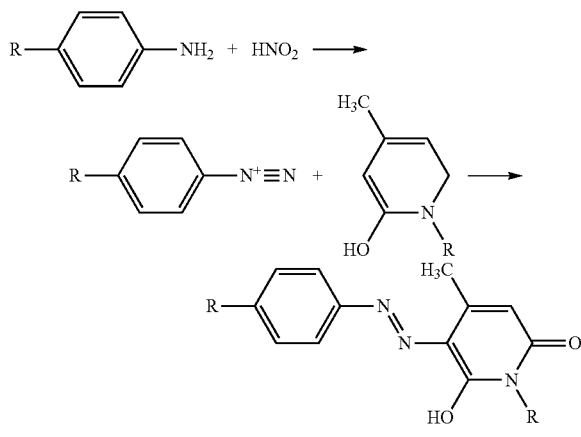

Scheme 3: Dyes of Formula III:

The preparation of dyes of Formula III by a 2 step procedure under convenient conditions as known in the art is exemplified in the following scheme for (E)-3-Methyl-4-((4-nitrophenyl)diazenyl)-N,N-dioctylaniline:

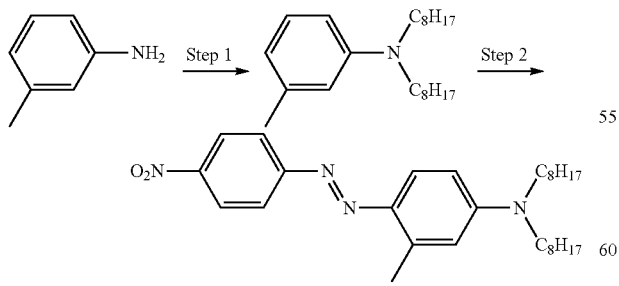

Scheme 4: Dyes of Formula IV:

The preparation of dyes of Formula IV by a 2 step procedure under convenient conditions as known in the art is exemplified in the following scheme

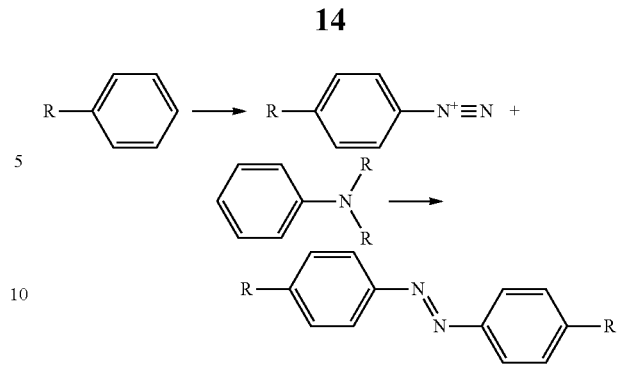

Scheme 5: Dyes of Formula V:

The preparation of dyes of Formula V under convenient conditions as known in the art is exemplified in the following scheme for 1,4-Bis(2-ethylhexyl/n-octyl/n-undecyl/n-dodecyl-amino)anthracene-9,10-dione:

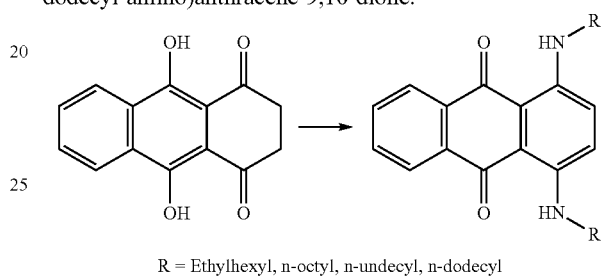

R = Ethylhexyl, n-octyl, n-undecyl, n-dodecyl

Scheme 6: Dyes of Formula 6:

The preparation of dyes of Formula 6 by a 2 step procedure under convenient conditions as known in the art is exemplified in the following scheme for N-(2-((4-Cyano-3-methylisothiazol-5-yl)diazenyl)-5-(dioctylamino)phenyl)acetamide:

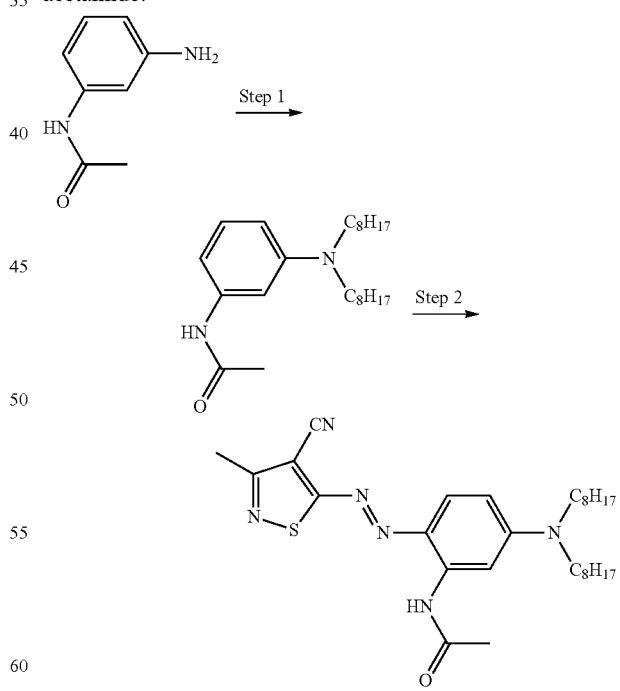

The preparation of further dyes can be carried out analogously to the illustrative reactions shown above and in the examples.

Particularly preferred dyes and dye mixtures are listed in Table 5:

TABLE 6
| Dye ref | Colour | Structure |
|---|---|---|
| Dye 8 | Red | 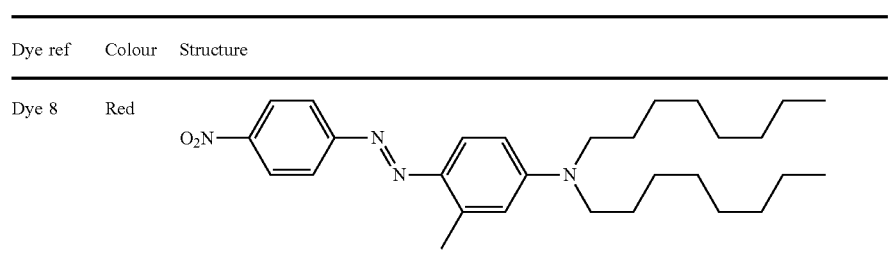 |
| Dye6/Dye2 | Green | 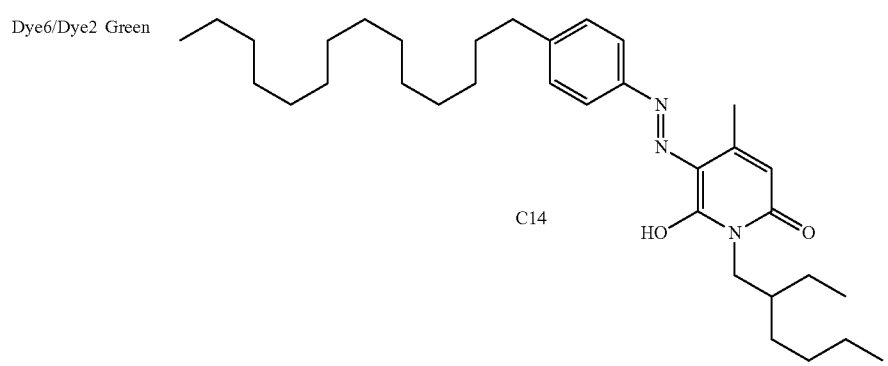 |
| | | 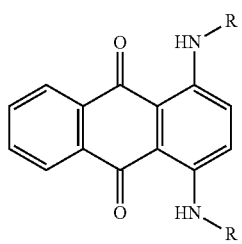 R = n-octyl/2-ethylhexyl/undecyl/dodecyl |
| Dye 2 | Blue | 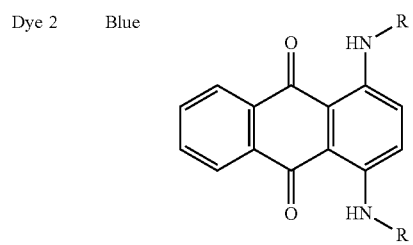 R = n-octyl/2-ethylhexyl/undecyl/dodecyl |
| Dye 4 | Magenta | 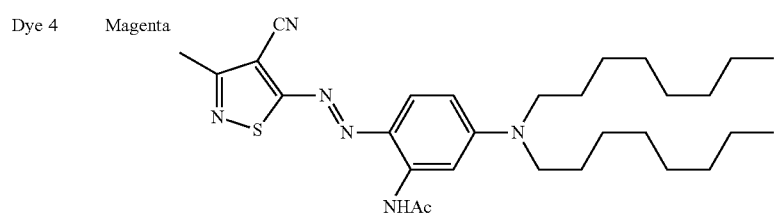 |

TABLE 6-continued

| Dye ref | Colour | Structure |
|---|---|---|
| Dye6/Dye5 | Yellow | 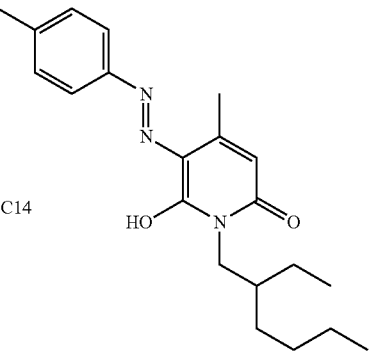 |

Electrophoretic fluids of the invention additionally comprise white and coloured particles selected from red, green, blue, magenta, cyan, and yellow particles. Usually, the white particles and the coloured particles are oppositely charged or chargeable. When more than one set of coloured particles are used, they usually are oppositely charged or chargeable.

Any white particles commonly used in electrophoretic fluids may be used in the new electrophoretic fluids. The white particles can preferably be selected from titanium dioxide in the rutil, anatase, or amorphous modification, surface coated titanium dioxide, titanium dioxide based particles, and white polymer particles. Usually electrophoretic fluids comprise white inorganic nanoparticles such as titania, alumina or barium sulphate, usually coated with a surface layer to promote good dispersibility in dielectric media and a dielectric fluid media.

Furthermore, the electrophoretic fluids of the present invention may comprise white polymer particles prepared by a process comprising the steps of a) forming a reverse emulsion comprising at least one polymer, at least one white reflective, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle. Such white reflective particles are described in WO 2011/154104.

Preferably, the electrophoretic fluids of the present invention may comprise white polymer particles comprising a core particle and a polymeric shell adsorbed onto the core particle wherein the polymeric shell consists of a random copolymer having monomer or macromonomer building blocks, and the random copolymer comprises at least one charged or chargeable, optionally hydrocarbon insoluble, structural unit and at least one hydrocarbon soluble, stabilising structural unit. Such white polymer particles are preferably prepared the process described in WO 2013/149714.

The electrophoretic fluids of the invention comprise at least one set of coloured particles selected from red, green, blue, magenta, cyan, and yellow particles. Mixtures thereof may also be used. Preferably, the electrophoretic fluids of the invention comprise one set of coloured particles selected from red, green, blue, magenta, cyan, and yellow particles. In another variant of the invention, the electrophoretic fluids comprise two sets of coloured particles selected from red, green, blue, magenta, cyan, and yellow particles and wherein the two sets of coloured particles have different colours. Any coloured particles selected from red, green, blue, magenta, cyan, and yellow particles commonly used in electrophoretic fluids may be used in the new electrophoretic fluids. Preferably transmissive coloured particles are used.

Preferably, coloured particles may be used which are prepared by a process comprising the steps of a) forming a reverse emulsion comprising at least one polymer, at least one coloured particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle. These coloured particles are described in WO 2013/026519.

Furthermore, the electrophoretic fluids of the present invention may comprise coloured polymer particles comprising a polymerised or co-polymerised dye. Such coloured polymer particles are described in WO 2009/100803, WO 2010/089057, WO 2010/089058, WO 2010/089059, WO 2010/089060, WO 2011/154103 and/or WO 2012/019704.

Especially coloured copolymers particles comprising monomer units of at least one monomer, of at least one polymerisable dye, optionally of at least one charged co-monomer, and optionally of at least one crosslinking co-monomer are preferred. The polymerisable dye comprises preferably a chromophore, preferably an azo group, anthraquinone group or phthalocyanine group, one or more polymerisable groups, and optional linker groups. To enhance the surface stabilisation or steric repulsions of the coloured polymeric particles in a non-polar continuous phase, a steric stabiliser is preferably incorporated into the coloured polymer particles. Such coloured polymer particles are described in WO 2010/089057 and WO 2012/019704. Preferably transmissive coloured particles prepared according to WO 2012/019704 are suitable for the present invention.

In a preferred variant of the invention, the electrophoretic fluids comprise the preferred dyes described, titania, and coloured polymer particles according to WO 2012/019704, wherein titania is preferably surface coated.

In a preferred variant of the invention, the electrophoretic fluids comprise the preferred dyes described, white reflective polymer particles prepared by a RESR process described above, and coloured polymer particles prepared by a RESR process described above.

Especially preferred electrophoretic fluids comprise dyes of Formulas I to VI, particularly those listed in Tables 1 to 4, white reflective polymer particles prepared according to WO 2013/149714, and coloured polymer particles prepared according to WO 2012/019704.

Electrophoretic fluids of the invention preferably provide different colour states on vertical movement of the particles, preferably in combination with adequate spacing of the particles. Especially, electrophoretic fluids of the invention provide a first colour state based on the colour of the dye, and a second colour state based on the colour of the dye and on the colour of the coloured particles. Also, electrophoretic fluids of the invention can provide a first colour state based on the colour of the dye, a second colour state based on the colour of the dye and on the colour of the coloured particles, and a third colour state based on the white particles.

Therefore, the present invention also relates to a method of displaying different colour states in an electrophoretic display by moving the particles vertically and increasing or reducing the spacing between white particles and/or coloured particles in an electrophoretic fluid.

Preferably the invention relates to a method of displaying different colour states in an electrophoretic display by moving the particles vertically and increasing or reducing the spacing between white particles and/or coloured particles in an electrophoretic fluid wherein a) a first colour state is achieved based on the colour of the dye by increasing the spacing between the white particles,
b) a second colour state is achieved based on the colour of the dye and on the colour of the coloured particles by increasing the spacing between the coloured particles, and optionally
c) a white colour state is achieved by reducing the spacing between the white particle.

The invention also relates to a second method of displaying different colour states in an electrophoretic display by moving the particles vertically and increasing or reducing the spacing between white particles and/or coloured particles in an electrophoretic fluid wherein a) a first colour state is achieved based on the colour of a first set of coloured particles by reducing the spacing between the coloured particles of the first set of coloured particles,
b) a second colour state is achieved based on the colour of a second set of coloured particles by reducing the spacing between the coloured particles of the second set of coloured particles,
c) a third colour state is achieved based on the colour of the dye and on the colour of the first set of coloured particles by increasing the spacing between the coloured particles of the first set of coloured particles,
d) a fourth colour state is achieved based on the colour of the dye and on the colour of the second set of coloured particles by increasing the spacing between the coloured particles of the second set of coloured particles, and optionally
e) a white colour state is achieved by reducing the spacing between the white particle, and optionally
f) further colour states are achieved based on the colour of one or more further sets of coloured particles by reducing the spacing between the coloured particles of the further sets of coloured particles, and/or optionally
g) further colour states are achieved based on the colour of the dye and on the colour of the one or more further sets of coloured particles by increasing the spacing between the coloured particles of the further sets of coloured particles.

This embodiment preferably concerns a method of displaying different colour states in an electrophoretic display by moving the particles vertically and increasing or reducing the spacing between two sets of coloured particles in an electrophoretic fluid wherein a) a first colour state is achieved based on the colour of a first set of coloured particles by reducing the spacing between the coloured particles of the first set of coloured particles,
b) a second colour state is achieved based on the colour of a second set of coloured particles by reducing the spacing between the coloured particles of the second set of coloured particles,
c) a third colour state is achieved based on the colour of the dye and on the colour of the first set of coloured particles by increasing the spacing between the coloured particles of the first set of coloured particles, and
d) a fourth colour state is achieved based on the colour of the dye and on the colour of the second set of coloured particles by increasing the spacing between the coloured particles of the second set of coloured particles.

Vertical particle movement and particle spacing can be controlled electrically. The particle spacing can be varied to change either the whiteness, or colourfulness as desired. For some applications, it may be desirable to have a white 'extreme' state—whereby the display looks white when the white particles are compressed on the top electrode. In this case particle spacing must be minimised, and the colour state would then have to be achieved electrically using drive schemes. This would consist of a short pulse of DC voltage to move the particles across the distance of the cell. The exact details of drive scheme will vary dependent on the particle speed and required colour saturation. For a formulation with a response time of 100 ms, it could be envisaged that by applying a voltage for 40-45 ms, the particles could be moved to a point of maximum colour saturation. The level of colour saturation could be controlled by applying voltage pulses of different duration.

Electrophoretic fluids of the invention are primarily designed for use in electrophoretic displays, especially in bi or polychromal electrophoretic devices. A typical electrophoretic display preferably consists of the particles dispersed in a low polar or non-polar solvent along with additives to improve electrophoretic properties, such as stability and charge. Examples of such dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

Typical additives to improve the stability of the fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich). Preferable surfactant additives in this work are Solsperse range and A-OT, and even more preferably Solsperse 17,000, 13650, 11000 and Solplus K500, A-OT and Span 85. Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (e.g. PEO/PEG/PPG), polyols (e.g. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants.

Any other additives to improve the electrophoretic properties can be incorporated provided they are soluble in the formulation medium, in particular thickening agents or polymer additives designed to minimise settling effects.

The dispersion solvent for the electrophoretic fluids of the invention is preferably a good solvent for the dyes and surfactants being used and can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles.

Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (ExxonMobil), Norpar, Shell-Sol (Shell), Sol-Trol (Shell), naphtha, and other petroleum solvents, as well as long chain alkanes such as nonane, decane, dodecane, and tetradecane. These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich).

Preferably, the electrophoretic fluids of the invention comprise at least one solvent selected from long chain alkanes, at least two kinds of particles having different colour and opposite electrical charge, and at least one highly absorbing dye, wherein the dye preferably has an absorbance of at least 0.5 a.u. in a cell thickness of 50 microns.

Particularly, combinations of the preferred dyes, preferred white particles, preferred coloured particles, and preferred solvents are used for electrophoretic fluids of the invention.

Even more preferred electrophoretic fluids of the invention comprise non-polar hydrocarbon solvents, the preferred dyes described, white reflective polymer particles prepared by a RESR process described above or surface coated titania, and coloured polymer particles prepared by a RESR process described above or coloured polymer particles described above comprising a polymerised or co-polymerised dye.

Especially preferred electrophoretic fluids comprise non-polar hydrocarbon solvents, dyes of Formulas I to VI, particularly those listed in Tables 1 to 4, white reflective polymer particles prepared by a RESR process described above or surface coated titania, and coloured polymer particles described above comprising a polymerised or co-polymerised dye, especially the coloured polymer particles according to WO 2012/019704.

Even more preferred electrophoretic fluids comprise nonane, decane, dodecane, and tetradecane or mixtures thereof, dyes of Formulas I to VI, particularly those listed in Tables 1 to 4, white reflective polymer particles prepared according to WO 2013/149714, and coloured polymer particles prepared according to WO 2012/019704.

Usually, all variants of the invention comprise at least one additive to improve electrophoretic properties, such as stability and charge, preferably at least one surfactant, especially the preferred surfactants described above. Particularly, electrophoretic fluids of the invention may consist of solvents, dyes, white particles, coloured particles, and surfactants as described in the foregoing, preferably of all these components described as being preferred, especially of all these components described as being specially preferred.

The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046. The Electrophoretic fluid is then incorporated into an Electrophoretic display element by a variety of pixel architectures, such as can be found in C. M. Lampert, Displays; 2004, 25(5) published by Elsevier B. V., Amsterdam.

Electrophoretic displays comprise typically, the electrophoretic display media in close combination with a monolithic or patterned backplane electrode structure, suitable for switching the pixels or patterned elements between the optical states or their intermediate states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B. V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are expressly also part of the disclosure content of the present patent application. Unless the context clearly indicates otherwise, plural forms of the terms used herein are to be construed as including the singular form and vice versa. In the claims and the description, the words "comprise/comprises/comprising" and "contain/contains/containing" mean that the listed components are included but that other components are not excluded. Throughout the specification, C stands for Cyan, M stands for Magenta, Y stands for Yellow, R stands for Red, G stands for Green, and B stands for Blue The following examples explain the present invention in greater detail without restricting the scope of protection. In the foregoing and in the following examples, unless otherwise indicated all parts and percentages are by weight (wt).

EXAMPLES

The transmissive CYAN particles are prepared according to Example 26/11 of WO 2012/019704.

The transmissive MAGENTA particles are prepared according to Example 26/30 of WO 2012/019704.

The WHITE particles are prepared according to Example 2 of WO 2013/149714.

The YELLOW dye is prepared according to Example 15 of WO 2013/127494.

All other chemicals are purchased from Sigma-Aldrich. All chemicals are purchased at the highest grade possible and are used without further purification unless otherwise stated.

The characterisation of the formulations is performed using an Xrite Color i5 spectrophotometer to measure the colour coordinates of the extreme states. The absorbance of the dyes is measured using a Hitachi U3310 UV-vis spectrophotometer. All dye samples are measured at the concentration used in the examples, with no particles present, in glass cells with a 50 micron spacing.

Example 1: CYAN+WHITE Dual Particle Fluid with Yellow Dye 0.15 g of AOT and 0.35 g of Span 85 are added to 1.5 g of a 50% w/w dispersion of transmissive CYAN particles in dodecane and 5.0 g of a 30% w/w dispersion of White particles in dodecane to give approximately 7 g of CYAN/WHITE particle dispersion concentrate. 0.4 g of YELLOW dye are added to the concentrate, and vortex mixed for 60 seconds.

0.02 g of the resultant dispersion is capillary filled into a test cell consisting of two ITO coated plates for glass separated by a 50 micron spacer bead. A voltage of +15V is applied and the colour coordinates measured using an xrite color i5 spectrophotometer in reflective mode with integrating sphere. All results are communicated based on d65 illumination. The measurement is repeated with a voltage of −15V applied. Results are shown in Table 6 and FIG. 2.

TABLE 7

| Name | L* | a* | b* | X | Y | Z | x | y |
|---|---|---|---|---|---|---|---|---|
| Example 1 +15 V | 69.03 | 0.99 | 78.9 | 37.642 | 39.383 | 4.162 | 0.4636 | 0.4851 |
| Example 1 −15 V | 21.46 | −30.8 | 22.38 | 1.692 | 3.368 | 1.009 | 0.2789 | 0.555 |

Example 2: MAGENTA+WHITE Dual Particle Fluid with YELLOW Dye 0.15 g of AOT and 0.35 g of Span 85 are added to 1.5 g of a 50% w/w dispersion of transmissive MAGENTA particles in dodecane and 5.0 g of a 30% w/w dispersion of White particles in dodecane to give approximately 7 g of MAGENTA/WHITE particle dispersion concentrate. 0.4 g of YELLOW dye are added to the concentrate, and vortex mixed for 60 seconds.

0.02 g of the resultant dispersion is capillary filled into a test cell consisted of two ITO coated plates for glass separated by a 50 micron spacer bead. A voltage of +15V is applied and the colour coordinates measured using an xrite color i5 spectrophotometer in reflective mode with integrating sphere, all results are communicated based on d65 illumination. The measurement is repeated with a voltage of −15V applied. Results are shown in Table 7 and FIG. 2.

TABLE 8

| Name | L* | a* | b* | X | Y | Z | x | y |
|---|---|---|---|---|---|---|---|---|
| Example 2 +15 V | 68.83 | 1.8 | 79.18 | 37.625 | 39.104 | 4.048 | 0.4658 | 0.4841 |
| Example 2 −15 V | 34.47 | 48.72 | 45.72 | 14.319 | 8.237 | 0.945 | 0.6093 | 0.3505 |

FIGURES

Figure 1:
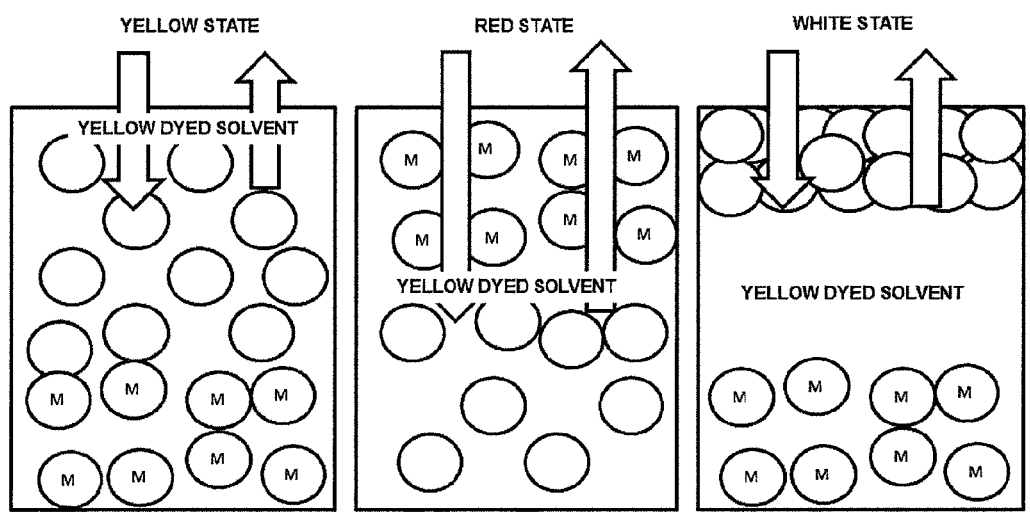
FIG. 1 shows the application of a multi-particle system for Y/R/W states.
Figure 2:
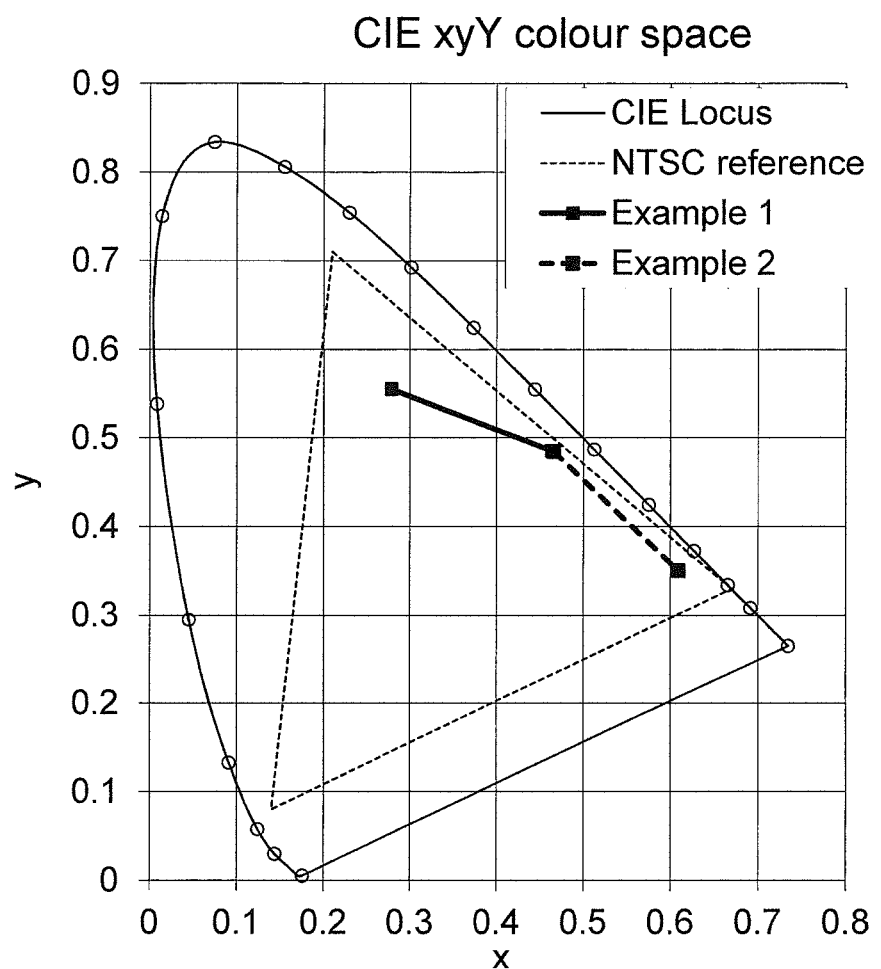
FIG. 2 shows colour data for Examples 1 and 2

The invention claimed is:

1. An electrophoretic fluid comprising at least one solvent, at least one dye, and a) white particles, and at least one set of colored particles or b) at least two sets of colored particles having different colors and optionally white particles, wherein the colored particles in a) and b) are selected from red, green, blue, magenta, cyan, and yellow particles, and mixtures thereof;

wherein the electrophoretic fluid comprises at least one dye according to Formula I, Formula II, Formula III, Formula IV, Formula V or Formula VI Formula I wherein
X and X' are independently of one another H or an electron-withdrawing group;
$R_1$ and $R_2$ are independently of one another groups are linear or branched, substituted or unsubstituted alkyl groups where one or more non-adjacent carbon atoms may be replaced by O, S and/or N;
$R_3$ and $R_4$ are independently of one another groups are linear or branched, substituted or unsubstituted alkyl groups where one or more non-adjacent carbon atoms may be replaced by O, S and/or N;
R5 is a methyl or methoxy group;
and the dye comprises at least one electron-withdrawing group;

Formula II wherein
$R_6$ and $R_7$ are independently of one another groups are linear or branched, substituted or unsubstituted alkyl groups where one or more non-adjacent carbon atoms may be replaced by O, S and/or N;

Formula III wherein
X" is an electron-withdrawing group;
$R_8$ is a methyl or methoxy group;
$R_9$ and $R_{10}$ are independently of one another groups are linear or branched, substituted or unsubstituted alkyl groups where one or more non-adjacent carbon atoms may be replaced by O, S and/or N;

Formula IV wherein
$R_{12}$ and $R_{13}$ are independently of one another groups are linear or branched, substituted or unsubstituted alkyl groups where one or more non-adjacent carbon atoms may be replaced by O, S and/or N;
$R_{11}$ is an alkyl or alkoxy group with at least 3 carbon atoms;

Formula V wherein
$R_{14}$ and $R_{15}$ are independently of one another groups are linear or branched, substituted or unsubstituted C8-C20 alkyl groups where one or more non-adjacent carbon atoms may be replaced by O, S and/or N;

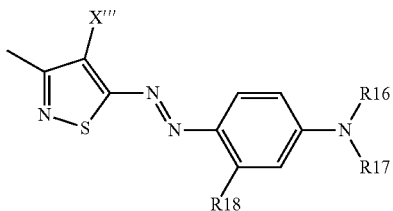

Formula VI wherein

X''' is an electron-withdrawing group;

$R_{16}$ and $R_{17}$ are independently of one another groups are linear or branched, substituted or unsubstituted alkyl groups where one or more non-adjacent carbon atoms may be replaced by O, S and/or N;

$R_{18}$ is NHCOR with R=linear or branched C1-C10 alkyl groups.

2. The electrophoretic fluid according to claim 1, wherein the electrophoretic fluid comprises in a) transmissive colored particles and in b) reflective coloured particles.

3. The electrophoretic fluid according to claim 1, wherein the electrophoretic fluid comprises at least one solvent, at least one dye, white particles, and a set of colored particles selected from red, green, blue, magenta, cyan, and yellow particles.

4. The electrophoretic fluid according to claim 1, wherein the electrophoretic fluid provides different color states on vertical movement of the particles and increased or reduced spacing between particles.

5. The electrophoretic fluid according to claim 1, wherein the electrophoretic fluid has a first color state based on the color of the dye, and a second color state based on the color of the dye and on the colored particles.

6. The electrophoretic fluid according to claim 1, wherein the electrophoretic fluid has a first color state based on the color of the dye, a second color state based on the colour color of the dye and on the colored particles, and a third color state based on the white particles.

7. The electrophoretic fluid according to claim 1, wherein the dye or a dye mixture has an absorbance of at least 0.3 a.u. in a cell thickness of 50 microns.

8. The electrophoretic fluid according to claim 1, wherein the electrophoretic fluid comprises at least two dyes wherein each dye comprises at least one chromophoric group and at least one solubilizing group and wherein at least two dyes comprise different solubilizing groups.

9. The electrophoretic fluid according to claim 1, wherein the electrophoretic fluid comprises at least one non-polar solvent having a dielectric constant <10, volume resistivity about $10^{15}$ ohm-cm, viscosity <5 cst, and a boiling point >80° C.

10. The electrophoretic fluid according to claim 1 wherein the colored particles are colored polymer particles.

11. The electrophoretic fluid according to claim 1, wherein the electrophoretic fluid comprises white particles selected from titanium dioxide in the rutil, anatase, or amorphous modification, surface coated titanium dioxide, titanium dioxide based particles, and white polymer particles.

12. A method comprising utilizing the electrophoretic fluids according to claim 1 for the preparation of a bi or polychromal electrophoretic device.

13. An electrophoretic display device comprising an electrophoretic fluid according to claim 1.

14. A method comprising displaying different color states in an electrophoretic display according to claim 13 by moving the particles vertically and increasing or reducing the spacing between white particles and/or colored particles.

15. The method according to claim 14 comprising
a) achieving a first color state based on the color of the dye by increasing the spacing between the white particles,
b) achieving a second color state based on the color of the dye and on the color of the colored particles by increasing the spacing between the colored particles, and optionally c) achieving a white color state by reducing the spacing between the white particle.

16. A method comprising displaying different color states in an electrophoretic display comprising an electrophoretic fluid comprising at least one solvent, at least one dye, and a) white particles, and at least one set of colored particles or b) at least two sets of colored particles having different colors and optionally white particles, wherein the colored particles in a) and b) are selected from red, green, blue, magenta, cyan, and yellow particles, and mixtures thereof by moving the particles vertically and increasing or reducing the spacing between white particles and/or colored particles; said method comprising:
a) achieving a first color state based on to the color of a first set of particles by reducing the spacing between the particles of the first set of particles,
b) achieving a second color state based on the color of a second set of particles by reducing the spacing between the colored particles of the second set of particles,
c) achieving a third color state based on the color of the dye and on the color of the first set of coloured colored particles by increasing the spacing between the colored particles of the first set of particles,
d) achieving a fourth color state based on the color of the dye and on the color of the second set of colored particles by increasing the spacing between the colored particles of the second set of particles, and optionally
e) achieving a white color state by reducing the spacing between the white particles.

17. The electrophoretic display device according to claim 13, wherein the electrophoretic fluid is applied by a technique selected from inkjet printing, slot die spraying, nozzle spraying, and flexographic printing, or any other contact or contactless printing or deposition technique.

* * * * *